(12) United States Patent
Degli Esposti et al.

(10) Patent No.: US 12,221,293 B2
(45) Date of Patent: Feb. 11, 2025

(54) METHOD FOR SETTING UP A MOVABLE OPERATING MEMBER OF AN AUTOMATIC MACHINE FOR MANUFACTURING OR PACKAGING CONSUMER ARTICLES

(71) Applicant: G.D SOCIETA' PER AZIONI, Bologna (IT)

(72) Inventors: Matteo Degli Esposti, Bologna (IT); Luca Carboni, Bologna (IT); Maurizio Zanotti, Bologna (IT)

(73) Assignee: G.D SOCIETA' PER AZIONI, Bologna (IT)

( * ) Notice: Subject to any disclaimer, the term of this patent is extended or adjusted under 35 U.S.C. 154(b) by 223 days.

(21) Appl. No.: 17/641,806

(22) PCT Filed: Sep. 10, 2020

(86) PCT No.: PCT/IB2020/058411
§ 371 (c)(1),
(2) Date: Mar. 9, 2022

(87) PCT Pub. No.: WO2021/048780
PCT Pub. Date: Mar. 18, 2021

(65) Prior Publication Data
US 2022/0380144 A1    Dec. 1, 2022

(30) Foreign Application Priority Data
Sep. 10, 2019 (IT) .......................... 102019000015950

(51) Int. Cl.
*B65G 47/82* (2006.01)
*B65G 43/00* (2006.01)

(52) U.S. Cl.
CPC ............. *B65G 47/82* (2013.01); *B65G 43/00* (2013.01)

(58) Field of Classification Search
None
See application file for complete search history.

(56) References Cited

U.S. PATENT DOCUMENTS

| 5,092,449 A | 3/1992 | Bolin et al. |
| 6,718,222 B2 | 4/2004 | Bergo et al. |

(Continued)

FOREIGN PATENT DOCUMENTS

| CN | 1370717 A | 9/2002 |
| CN | 1749896 A | 3/2006 |

(Continued)

OTHER PUBLICATIONS

International Search Report and Written Opinion for Corresponding International Application No. PCT/IB2020/058411, mailing date Dec. 9, 2020.

(Continued)

*Primary Examiner* — William R Harp
(74) *Attorney, Agent, or Firm* — MARSHALL, GERSTEIN & BORUN LLP

(57) ABSTRACT

A method to set up at least one moveable operating member of an automatic machine for manufacturing consumer articles and comprising the steps of defining a first motion profile of the movable operating member and defining a corresponding second motion profile of an electric actuator system, which moves the moveable operating member with the first motion profile. The method calls for the further steps of: determining possible imperfections in the processing of the articles caused by the movable operating member; correcting, by means of an interface device and on the basis of the possible imperfections, the first motion profile, thus obtaining a first changed profile of the moveable operating member; and calculating, through a control unit, a reverse kinematics of the first changed profile so as to obtain a corresponding second changed profile to be commanded to the electric actuator system.

12 Claims, 5 Drawing Sheets

(56) References Cited

U.S. PATENT DOCUMENTS

| | | |
|---|---|---|
| 7,099,722 B2 | 8/2006 | Casey |
| 7,801,639 B2 | 9/2010 | Korajda et al. |
| 8,155,781 B2 * | 4/2012 | Birzer ............ G05B 19/4103 |
| | | 700/86 |
| 9,463,616 B2 | 10/2016 | Domeier et al. |
| 2009/0044491 A1 | 2/2009 | De Peitra et al. |
| 2018/0136623 A1 | 5/2018 | Matil et al. |

FOREIGN PATENT DOCUMENTS

| | | |
|---|---|---|
| CN | 101261501 A | 9/2008 |
| CN | 104275922 A | 1/2015 |
| DE | 10164496 A1 | 7/2003 |
| DE | 102008033549 A1 | 2/2009 |
| EP | 0836128 A1 | 4/1998 |
| EP | 0879795 A2 | 11/1998 |
| EP | 1117020 A2 | 7/2001 |
| EP | 3321754 A1 | 5/2018 |
| JP | H1179117 A | 3/1999 |
| WO | WO-2006/134036 A1 | 12/2006 |
| WO | WO-2012/101493 A1 | 8/2012 |

OTHER PUBLICATIONS

Observations by a third party for Corresponding European Patent Application No. 20786591.6 dated Nov. 15, 2022 (with machine translation).

Third party observations relating to European Patent Application No. 20786591.6, dated May 22, 2023.

\* cited by examiner

METHOD FOR SETTING UP A MOVABLE OPERATING MEMBER OF AN AUTOMATIC MACHINE FOR MANUFACTURING OR PACKAGING CONSUMER ARTICLES

CROSS-REFERENCE TO RELATED APPLICATIONS

This Patent Application is a U.S. national phase of International Patent Application No. PCT/IB2020/058411 filed Sep. 10, 2020, which claims the benefit of priority from Italian patent application 102019000015950 filed on Sep. 10, 2019, the respective disclosures of which are each incorporated herein by reference in their entireties.

TECHNICAL FIELD

The present invention relates to a method for setting up a movable operating member of an automatic machine for manufacturing or packaging consumer articles.

The field of application of the present invention is advantageously, but not limited to, an automatic packaging machine that manufactures cigarette packs and the method for controlling the same, to which the following disclosure will make explicit reference without any consequent loss of generality.

PRIOR ART

An automatic packaging machine comprises a plurality of movable operating members which act on consumer articles (for instance cigarette packs, foodstuffs, hygienic absorbent articles, etc.) in order to modify their shape, structure or position. The movable operating members are generally mechanical parts of different shapes and sizes which are adapted to process the consumer articles and which are actuated in most cases by means of electric motors or pneumatic cylinders.

During the initial start-up of the automatic machine, due to different assembly methods and the normal tolerances of the mechanical parts, it is often necessary, in order to achieve a high processing precision, to carry out a set-up of the movable operating members; i.e. it is necessary to carry out operations of calibration, filing, shimming or synchronization, which are necessary for the proper functioning of the automatic machine. In the absence of this set-up, the product will not meet the desired precision specifications in most cases, since the product will not meet the quality specifications agreed upon with the client, as the motion profile of the movable operating member will not correspond precisely to the profile developed in the design phase of the automatic machine.

These operations are currently carried out by technical experts directly on site. These technicians insert shims and/or modify parts (by filing, milling, cutting) so as to allow the movable operating member (or the last link of the machine) to perform the required processing with the desired precision.

The poor repeatability of these operations (each automatic machine is modified ad hoc according to the assembly and/or structural defects of the available parts) creates an incalculable variety between automatic machines, or parts of the same, which should be identical.

Moreover, the mechanical parts on which said technicians act are usually mechanical parts (in particular with kinematic sections), since the principal form of coordination of the different motors belonging to an automatic machine has been, until recently, purely mechanical.

Finally, also due to the mechanical nature of the processed parts, this set-up activity is rarely logged and/or shared, resulting in a considerable amount of wasted time when trouble-shooting subsequent malfunctions and when providing after-sales support to clients that acquire such automatic machines.

The document JP H1179117 describes a machine for avoiding that materials to be packaged are damaged while making the packaging materials accommodative in diversified sizes by a method wherein a driving source for moving a pusher forward and a driving source for transporting cut packaging sheets along the supply surface are controlled separately.

DESCRIPTION OF THE INVENTION

The object of the present invention is to provide a method for setting up a movable operating member of an automatic machine for manufacturing or packaging consumer articles, which is at least partially exempt from the aforementioned drawbacks and which, at the same time, is easy and economical to carry out.

In accordance with the present invention,
a method for setting up a movable operating member of an automatic machine for manufacturing or packaging consumer articles is provided as claimed in the attached claims. A machine adapted to implement the aforementioned method is also provided.

The claims describe preferred embodiments of the present invention and constitute an integral part of the present description.

BRIEF DESCRIPTION OF THE DRAWINGS

The present invention will now be described with reference to the attached figures, which illustrate non-limiting embodiments, wherein.

PREFERRED EMBODIMENTS OF THE INVENTION

Figure 1:
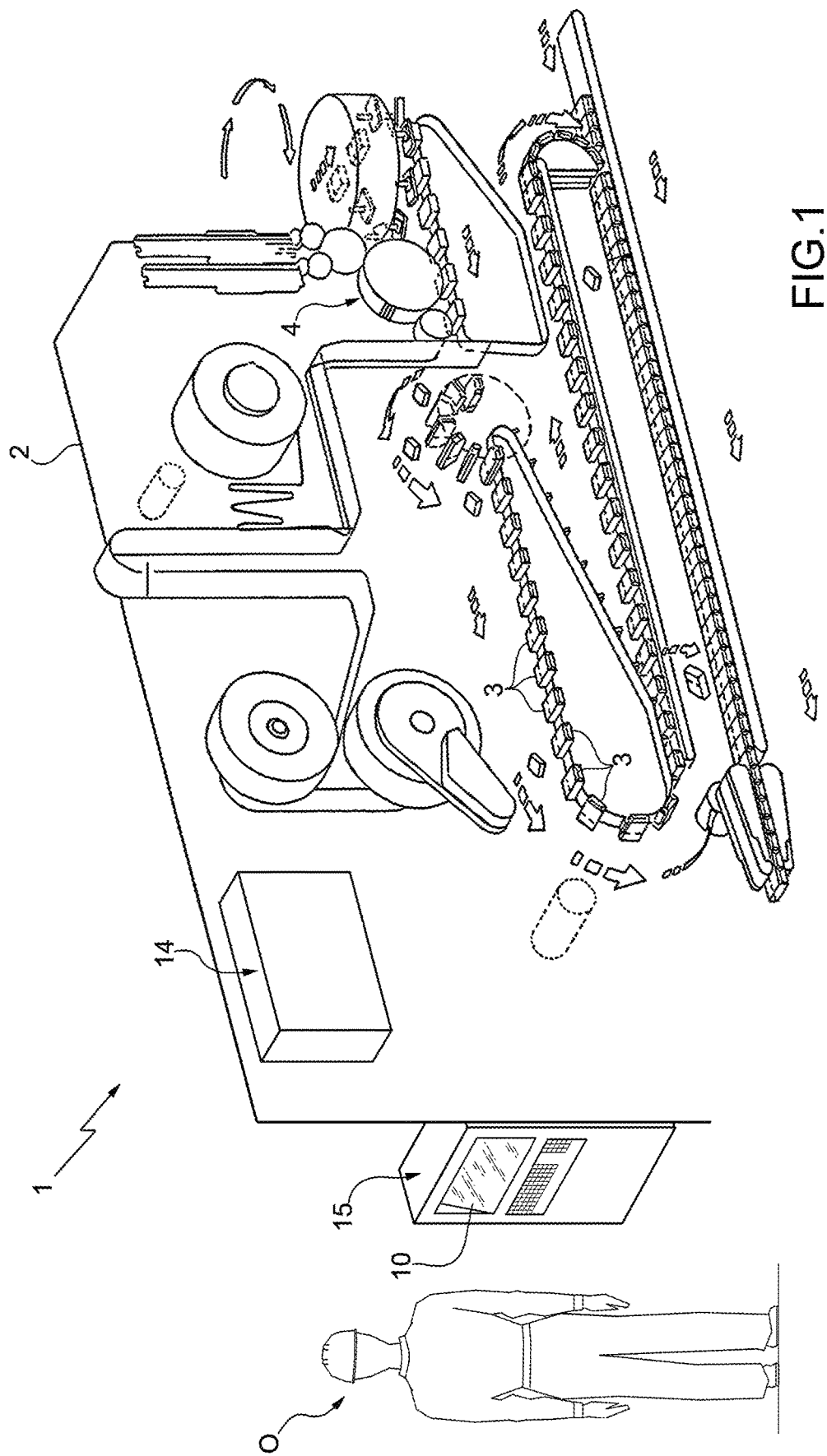
FIG. 1 is a perspective and schematic view of an automatic packaging machine for manufacturing packs.

FIG. 1 illustrates an automatic machine 1 for manufacturing articles of the tobacco industry, in particular an automatic packaging machine 1 for applying a transparent overwrap to cigarette packs.

The automatic machine 1 comprises a frame 2 on which a plurality of movable operating members (such as, for instance, grippers, drums, pushers, etc.) are mounted, which perform operations for the manufacture and/or packaging of consumer articles (which in the non-limiting embodiment illustrated in FIG. 1 are packs 3 of cigarettes).

In particular, the automatic machine 1 comprises a wrapping unit 4 provided with a plurality of movable operating members, each of which is moved by a corresponding electric motor (or by any kind of actuating device).

Figure 2:
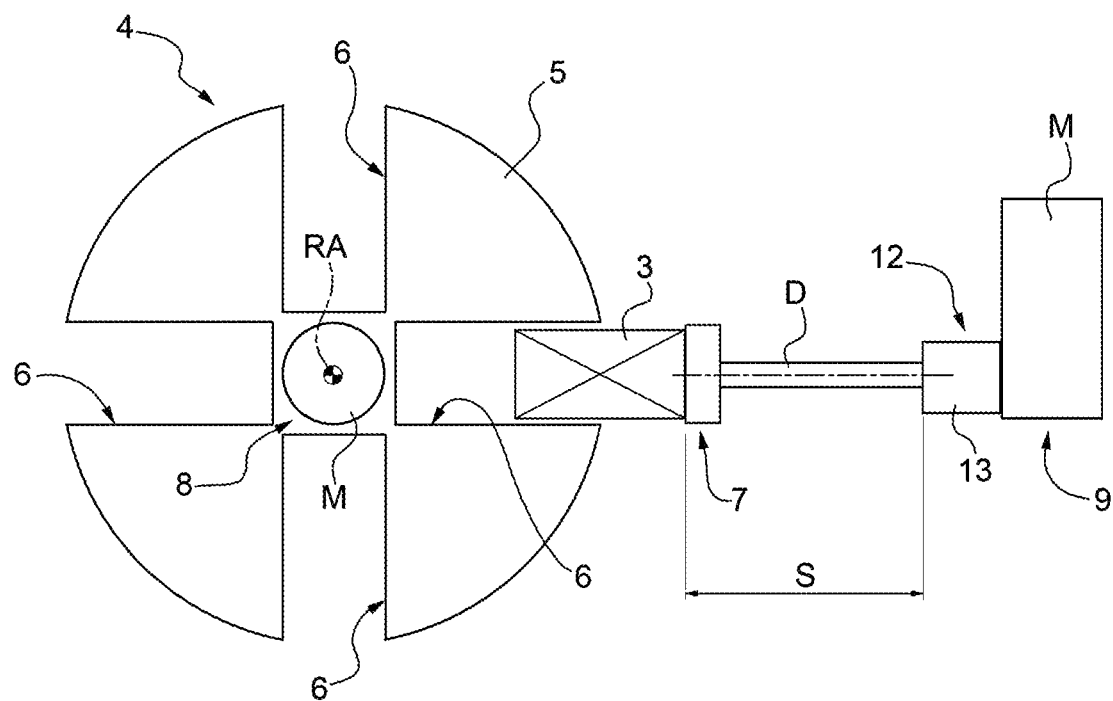
FIG. 2 is a schematic, partial side view of the automatic machine shown in FIG. 1, wherein two movable operating members are shown in a first configuration.
Figure 3:
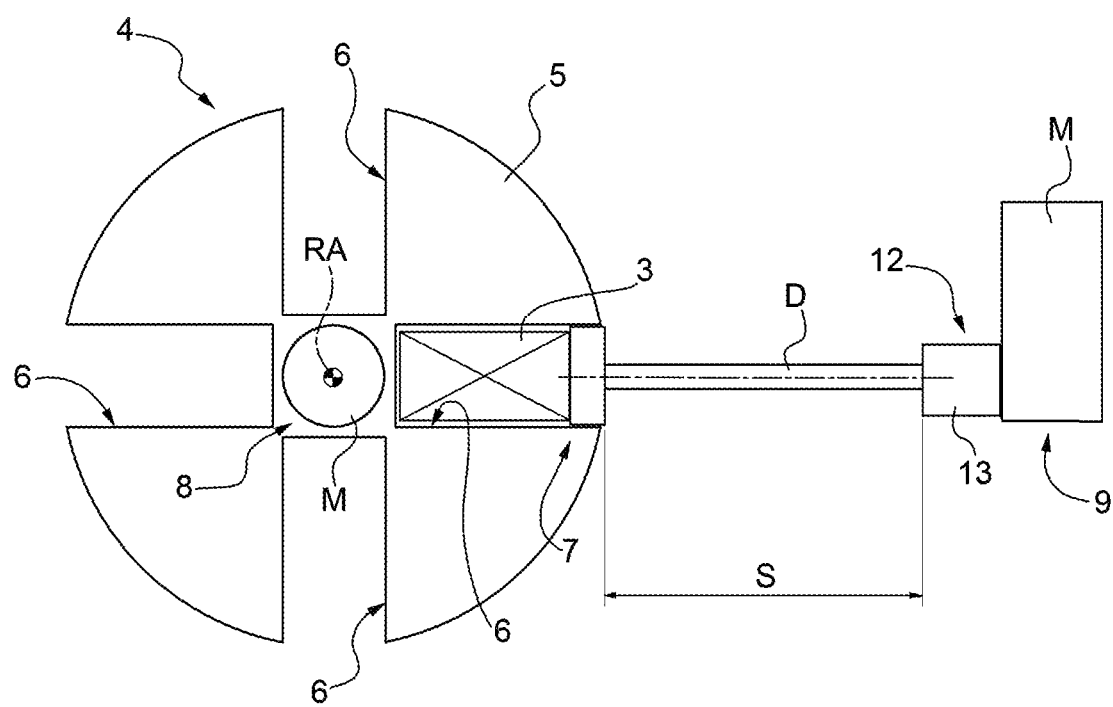
FIG. 3 is a schematic side view of the part shown in FIG. 2 in a second configuration.

In the non-limiting embodiment shown in FIGS. 2 and 3, the wrapping unit 4 comprises two movable operating members: a movable wheel 5 mounted in a rotatable manner around a central rotation axis RA and provided with chambers 6 (in particular pockets), adapted to receive the packs 3 of cigarettes, and a pusher 7 adapted to push the packs 3 of cigarettes into the chambers 6 of the movable wheel 5. The movable wheel 5 and the pusher 7 are consequently movable operating members, as they carry out processing actions (movements) on the packs 3.

In the non-limiting embodiment illustrated in FIGS. 2 and 3, the wrapping unit 4 of the automatic machine 1 also comprises two electric actuator systems 8 and 9. In particular, the two electric actuator systems 8 and 9 are two electric motors M. The electric actuator system 8 is coupled to the wheel 5 to cause the rotation of the wheel 5 around the rotation axis RA and is connected to a static power converter (known and not illustrated) which controls the electric actuator system 8 so as to cause the wheel 5 to rotate (through the interposition of a reducer not illustrated). The electric actuator system 9 is coupled to the pusher 7 to move the pusher 7 in a linear manner along a direction D and by a predefined stroke S (FIGS. 2 and 3) and is connected to a further static power converter (known and not illustrated) which controls the electric actuator system 9. In particular, the electric actuator systems 8 and 9 are connected to the movable operating members, i.e. to the wheel 5 and to the pusher 7 through the interposition of a motion transmission system 12 (for instance, as in the case of the pusher 7, a reducer 13 connected to a screw or an articulated quadrilateral linkage which transforms the circular movement into a linear movement, or, as in the case of the wheel 5, a reducer, for instance a planetary gear, which disengages the wheel 5 from moving at exactly the same speed as the motor M).

In other non-limiting cases not illustrated, the motion transmission system 12 is any device capable of transmitting the movement from the electric actuator systems 8 and 9 to the corresponding movable operating members (in the embodiment shown in FIGS. 2 and 3: the wheel 5 and the pusher 7), for instance: a mechanical cam, a rack, a crank mechanism, a kinematic chain, a parallel linkage.

According to preferred, non-limiting embodiments, the electric actuator systems 8 and 9 are brushless. In particular, the static power converters are drives which control, based on the desired method, the amount of current to be supplied to the respective electric actuator systems 8 and 9 and thus control said electric motors M.

The automatic machine 1 further comprises a control unit 14 (FIG. 1), which is configured to control the electric actuator systems 8 and 9.

The automatic machine 1 advantageously comprises an interface device 15 (illustrated in FIG. 1) configured to allow an operator O to change the motion of the movable operating members (for instance, of the wheel 5 and of the pusher 7).

In particular, the interface device 15 comprises a screen 10; more precisely, the screen 10 is a touchscreen.

In the non-limiting case shown in FIG. 2, the stroke S of the pusher 7 is not sufficient to insert the pack 3 perfectly inside the chamber 6 (in FIG. 2 the stroke S is insufficient by a large margin for the purposes of illustration; it is noted that such a shortfall can be in the order of a tenth of a millimetre).

In use, this situation entails a possible loss of the pack 3 during the rotation of the wheel 5 and/or a possible damaging of the pack 3 itself. The limited stroke S can be due to multiple factors, such as an erroneous assembly of one of the parts of the wrapping unit 4 (the pusher 7, the wheel 5, the motors M, a rod or a piston of the pusher, etc.) or an erroneous processing of said parts. In this case, the operator O, in order to speed up the set-up of the pusher 7, instead of inserting (fixing and/or welding) a shim in order to carry the pack 3 completely into the pocket 6 and instead of calling a designer to change the law of motion of the pusher 7, interacts with the interface device 15 so as to modify the motion profile of the motor M that moves the pusher 7. This way, once the motion profile has been modified by means of the interface device 15, the stroke S is such that it allows the complete entry of the pack 3 into the pocket 6, as illustrated in FIG. 3. In particular, the operator O will modify the motion profile of the motor M of the electric actuator system 9 by entering by how much it is desired to increase the stroke S of the pusher 7, regardless of the motion transmission system 12.

Obviously, this description also applies to cases different from the cited case in which the motion of a movable operating member is corrected by an operator O by means of the interface device 15 (operating at the level of the movable operating member and not at the level of the actuator system). By way of example, other cases could be: an excessive stroke S which compresses the pack 3 inside the chamber 6, an imprecise rotation of the wheel, etc.

Figure 4:
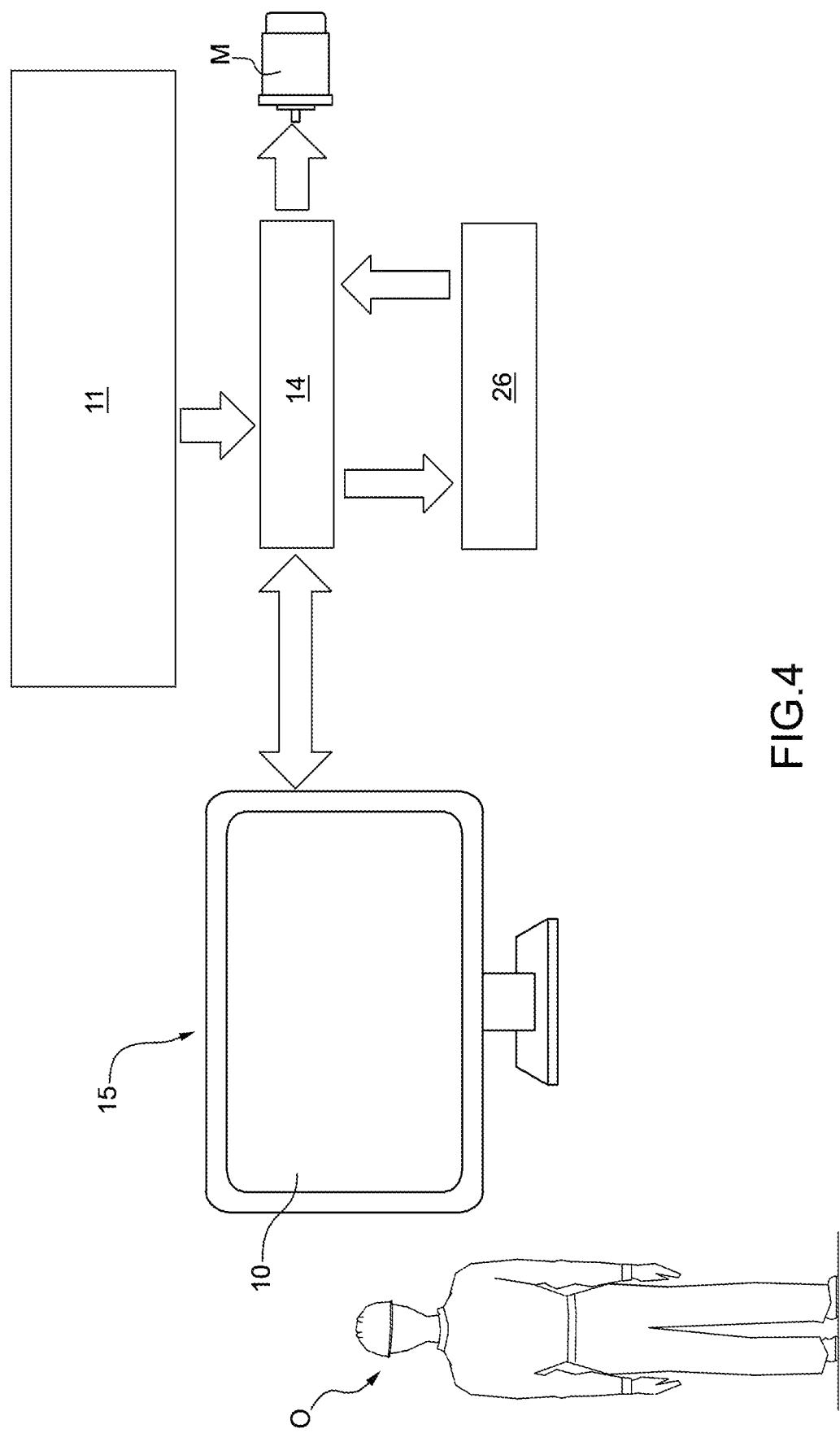
FIG. 4 illustrates schematically the structure and connection of parts of the machine shown in FIG. 1.

According to the non-limiting embodiment shown in FIG. 4, the control unit 14 is connected to the interface device 15, so as to allow the operator O to interact with said control unit 14. In particular, the control unit 14 comprises (or is connected to) a memory 11, in which the motion profiles are saved that the movable operating members of the automatic machine 1 will perform when in use.

Advantageously, yet not necessarily, the automatic machine 1 comprises a calculation unit 26, which is connected to the control unit 14 and configured to calculate changed motion profiles on the basis of the changes provided by the operator O by means of the interface device 15. In particular, such changed profiles will then be commanded to the motors M of the automatic machine by means of the control unit 14.

Figure 5:
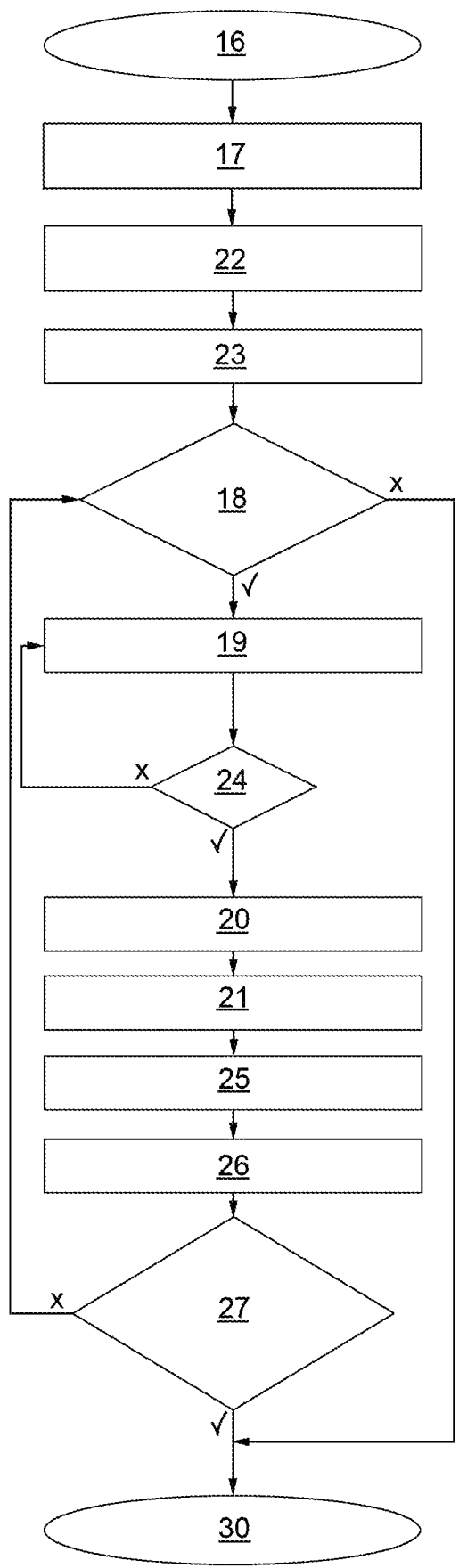
FIG. 5 illustrates a possible flowchart relating to the general steps of the method and how they can be related to one another.

FIG. 5 illustrates a flowchart representing a non-limiting embodiment of the method according to the present invention.

In the flowchart shown in FIG. 5, the convention has been used according to which oval blocks indicate the beginning or ending of the chart, rectangular blocks indicate a generic instruction and rhomboidal blocks, placed at a fork, are decision blocks containing a logical condition that determines the direction the flow will take. In particular, at the decision blocks, the flow of the chart forks in the direction indicated by the check mark symbol "✓" if the logical condition is satisfied; otherwise, if this condition is not satisfied, the flow forks in the direction marked by the symbol "X".

The method comprises a step 16 of defining a motion profile FP (illustrated in FIG. 6) of the movable operating member (for instance of the pusher 7), by means of which it performs at least one processing action on the articles (i.e. on the packs 3). In particular, the step 16 is performed during the designing of the automatic machine 1 and defines the specifications for the calculation of the profile FP implemented on the last link (i.e. on the movable operating member that one desires to move).

In order to move the pusher with the desired motion profile, the method comprises the subsequent step 17 of defining a motion profile SP of the electric actuator system 9 corresponding to the profile FP. In particular, the electric actuator system 9, through the motion transmission system 12, is mechanically connected to the movable operating member (i.e. to the pusher 7) and moves the movable operating member with the motion profile FP. In other words, during the step 17, the motion profile SP is defined that the electric actuator system 9, i.e. the electric motor M, must follow to make the pusher 7 move (i.e., in this non-limiting case, the movable operating member, i.e. the last link of the kinematic chain) with the profile FP.

Figure 6:
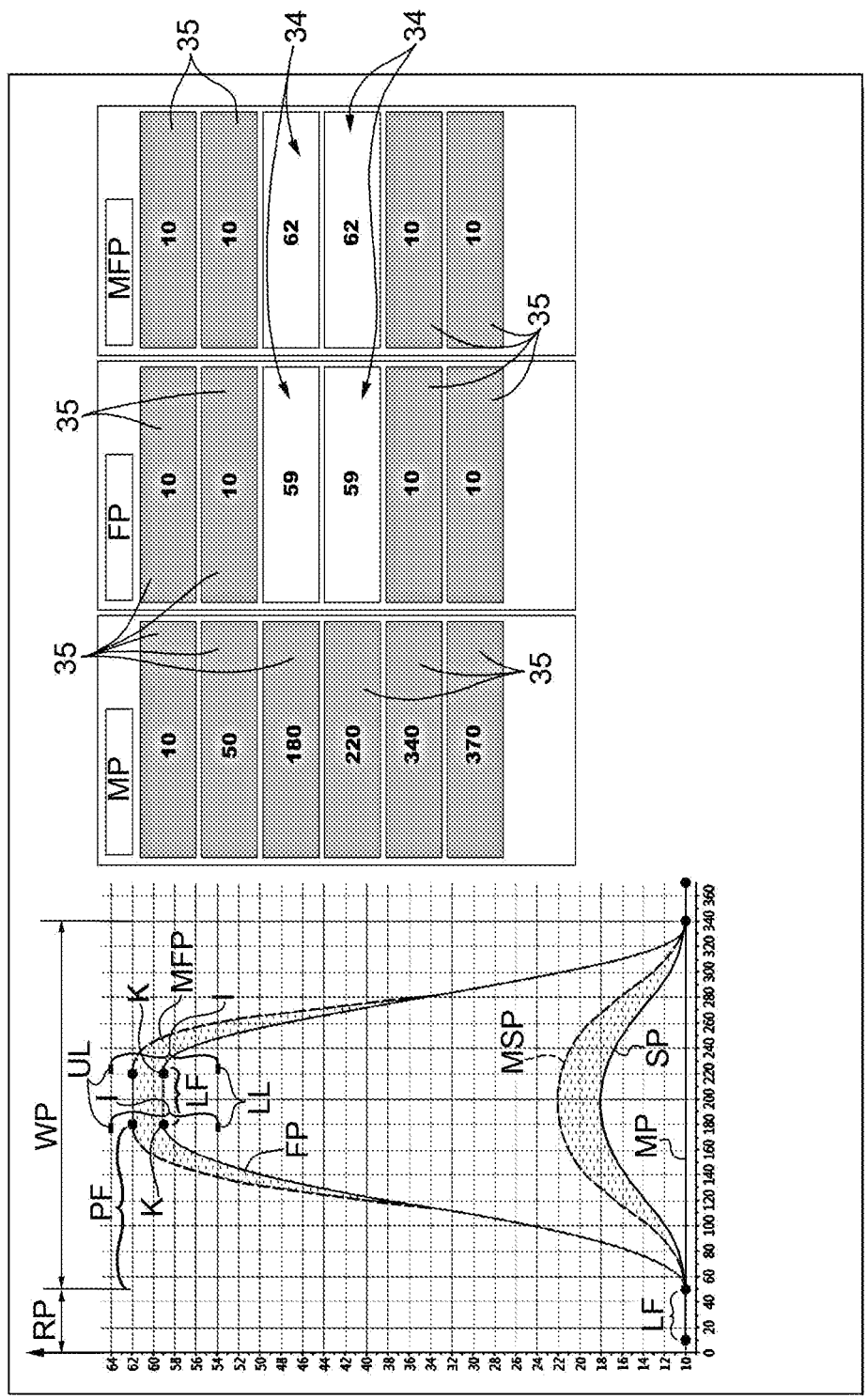
FIG. 6 illustrates schematically a possible screen of an interface of the automatic machine relating to the part shown in FIGS. 2 and 3.
Figure 6:
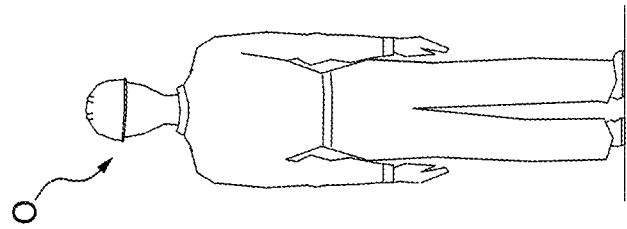

According to the non-limiting example illustrated in FIG. 6, the motion profile FP corresponds to the variation in the position of the pusher 7 along the stroke S shown in FIG. 2 (ordinate axis) with respect to a reference (abscissae axis), and the motion profile SP corresponds to the variation in position that the motor M of the electric actuator system 9 must perform in order to move the pusher with the profile FP.

According to a non-limiting example such as the example illustrated in FIG. 6, the motion profile FP describes the movement of the pusher 7 of the wrapping unit shown in FIG. 2. In particular, this profile calls for an initial step of advancing, a central step with a constant position and a final step of retreating.

The method advantageously also comprises a step 18 of determining possible imperfections in the processing of the articles (the packs 3) caused by the movable operating member (for instance, the pusher 7). In other words, during this step, the correct functioning of the movable operating member is checked. In the case in which, during this step, no imperfections are encountered, the method ends with the step 30, in which manufacturing of the packs 3 proceeds smoothly.

Advantageously, in the case in which, during the step 18, imperfections are determined in the processing of the articles, the method comprises the subsequent step 19 of correcting, by means of the interface device 15 of the automatic machine 1 and on the basis of the possible imperfections in the processing of the packs 3, the motion profile FP so as to obtain a changed profile MFP (FIG. 6) of the movable operating member (i.e. of the pusher 7). In this manner, it is possible to focus on the motion profile of the movable operating member so that, as a result, the task is disengaged from the mechanics of the motion transmission system 12.

According to the non-limiting embodiment shown in FIG. 5, the method comprises a step 20 of calculating, by means of the control unit 14, a reverse kinematics of the changed profile MFP of the movable operating member (for instance, the pusher 7) in order to obtain a corresponding changed profile MSP to be commanded to the electric actuator system 9. In particular, the reverse kinematics is evaluated while calculating the interposition of the motion transmission system 12 (e.g., of the reducer 13). In this manner, an operator performing corrections of the motion profile FP of the pusher 7 (for instance, as in the case shown in FIG. 2, by increasing the stroke of the pusher 7) in fact performs corrections of the motion profile SP of the electric actuator system 9 (which, in use, actively moves the pusher 7).

Advantageously, yet not necessarily, the method comprises the subsequent step 21 of changing the control in order to control the electric actuator system 9 so as to perform the corresponding changed profile MSP. In this manner, the electric actuator system 9 moves, through the interposition of the motion transmission system 12, the pusher 7 with the desired and correct changed profile MFP.

Advantageously, yet not necessarily, the step 18 of determining the possible imperfections and/or the step of correcting such imperfections are carried out by the operator O of the automatic machine 1, who uses the interface device 15 of said automatic machine 1. In this manner, the set-up of a movable operating member is much faster with respect to the scenarios of the prior art in which the operator must process components of the automatic machine 1 mechanically or submit the problem to a designer, in particular of a calculation department.

Advantageously, yet not necessarily, the step 18 of determining the possible imperfections is repeated following the step 19 of correcting the motion profile FP (more precisely following the step 21 of changing the control of the electric actuator system 9). In particular, once the step 19 of correcting the profile FP has been performed, an analysis step 27 is carried out following which, if the motion profile MFP carried out by the movable operating member (for instance, by the pusher 7) is satisfactory (accompanies the pack 3 inside the chamber 6 in its entirety, as shown in FIG. 3), one progresses to the step 30 (in which the manufacture of the packs 3 proceeds), while if the profile MFP is not satisfactory (the pusher 7 does not push the pack 3 in an accurate manner into the chamber 6), the steps 18, 19 and 27 are repeated iteratively until the desired performance is achieved by the movable operating member being set up.

Advantageously, yet not necessarily, the motion profile FP and the corresponding motion profile SP comprise at least one work phase WP (the movable operating member is running) and at least one recovery step RP (the movable operating member is still), during which the step 21 of changing the control occurs. In this manner, the correction of the control that changes the profile FP into the profile MFP avoids disturbing the movement of the electric actuator system 9 (i.e. of the motor M).

Advantageously, yet not necessarily, the method comprises a step 22 of identifying one or more knots K of the motion profile FP. At least some of these knots can be changed by means of the interface device 15, more precisely by the operator O.

In particular, the step 19 of correcting the profile FP is carried out by changing the value of the position of the movable operating member at the knots K.

According to non-limiting embodiments such as the embodiment illustrated in FIG. 6, the motion profile FP comprises at least one linear function segment LF.

Alternatively or additionally, the motion profile FP comprises at least one polynomial function segment PF (for instance, a polynomial of a degree higher than or equal to the fifth degree, a B-Spline of a degree higher than or equal to the third degree, . . . ). In particular, the knots K are the inflection points or the connection points of these function segments LF and PF.

Advantageously, yet not necessarily, the method comprises a step 23 of defining a tolerance interval I to limit the change of each knot K.

According to non-limiting embodiments such as the embodiment illustrated in FIG. 6, the tolerance interval I is linear and comprises an upper limit UL and a lower limit LL in the ordinate axis (last-link operating member). The interval I (thus the limits UL and LL) is chosen so as to respect the boundary conditions dictated by the system, in order to avoid mechanical collisions or risks for the automatic machine 1 and/or the operator O.

According to other non-limiting embodiments not illustrated, the tolerance interval I is linear and comprises an upper limit UL and a lower limit LL in the abscissae axis (reference). The interval I (thus the limits UL and LL) is chosen so as to respect the boundary conditions dictated by the system, in order to avoid mechanical collisions or risks for the automatic machine 1 and/or the operator O.

According to further non-limiting embodiments not illustrated, the tolerance interval I has a circular shape, the centre of which is a knot K.

Advantageously, yet not necessarily, before the step 20 during which the reverse kinematics is calculated, the control unit 14 checks (in the step 24 shown in FIG. 6) that all knots K of the motion profile FP of the movable operating member are each within the corresponding tolerance interval I. In the case in which knots K are outside of the interval I, one moves again from the step 24 to the step 19 so as to render possible the insertion of a value comprised by the tolerance interval I.

Advantageously, yet not necessarily, the method comprises a step 25 of gathering a plurality of data items (for instance, which variables have been changed and the extent of the change) concerning the step 19 of correcting the motion profile FP. In particular, the plurality of data items is used to carry out corrections of the motion profile FP in the phase of designing the machine 1 and/or to understand possible calculation errors. In this manner, it is possible to identify possible errors due to the acquisition of mechanical parts or errors relating to the design or calculation of the motion profiles FP.

In some advantageous, non-limiting scenarios, the plurality of gathered data items is used for the training of artificial intelligence systems. In particular, the plurality of gathered data items is analysed by means of decision tree algorithms to identify, in case of similar corrections of a plurality of automatic machines 1 with similar parts, possible improvements to be implemented immediately in the design phase.

According to some non-limiting embodiments, the step 21 of changing the control takes place while the automatic machine 1 is still. In this manner, it is possible to ensure greater safety for the operator O, who after each change controls the effectiveness of the same.

According to further non-limiting embodiments, the step 21 of changing the control occurs while the automatic machine 1 is running. In this manner, it is possible to accelerate the set-up of the movable operating member (for instance, of the pusher 7).

Advantageously, yet not necessarily, the motion profile FP and the motion profile SP have a cam relation with a master profile MP. It is understood by the expression "have a cam relation" that the motion profiles FP and SP are connected to a reference profile (the master profile MP) in a relationship that is modifiable instant by instant. In other words, this wording is intended to signify, for instance, that, for each position of the master profile MP, a corresponding position of the moveable operating member (the pusher 7) (and thus, indirectly, of the electric actuator system 9) is defined. The profile MP master thus relates, by knots, to the motion profile FP of the movable operating member. Such a relationship is useful for keeping all the movable operating members of the automatic machine in sync, which, being directly or indirectly connected to said master axis, follow the same not only during standard operation, but also in the phases of acceleration and deceleration of the automatic machine 1, in particular at the start and at the end of production of the articles.

In some non-limiting cases, the master profile MP is the profile of a physical axis, for instance a drive pulley or a wheel. In other non-limiting scenarios, the master profile MP is the profile of a virtual axis.

In FIG. 6, the abscissae axis corresponds to the position of the master profile MP and the ordinate axis corresponds to the position of the last link, i.e. of the movable operating member, for instance the pusher 7. In particular, the abscissae axis has values expressed in degrees, where a turn (360°) corresponds to a machine cycle, while the ordinate axis is expressed in mm. Therefore, in the non-limiting embodiment shown in FIG. 6, the profiles FP and MFP indicate the position of the pusher 7 along the stroke S in mm.

In use, the operator O, once imperfections in the processing of the articles have been determined (for instance, as soon as a stroke S that is too short has been determined), interacts with the control unit 14, by means of the interface device 15 so as to change the position of the knots K and thus the shape of the motion profile FP. In the non-limiting embodiment shown in FIG. 6, the operator O changes the position of the knots K by stipulating that the position of the pusher corresponding to the positions of the master profile from 180° to 220° be moved up by 3 mm (thus the position of the pusher passes from the 59 mm projected for the motion profile FP to 62 mm of the motion profile MFP). In this manner, the operator O changes the motion profile FP by specifying the changed profile MFP. Once this step has been completed, the calculation unit 26 works out the corresponding changed profile MSP of the motor M of the electric actuator system 9 (which in FIG. 6 is illustrated by way of example and not on the same scale as the profile FP). In particular, it should be noted that, in the non-limiting embodiment shown in FIG. 6, the operator can only change certain parameters written in the clear boxes, while the other parameters, contained in the shaded boxes, cannot be changed as they would compromise the safety of the machine 1 or the operator O (for instance, due to possible mechanical collisions).

Advantageously, yet not necessarily, the interface device 15 only allows the operator O to change a portion of the knots K (i.e. the ones included in the blocks 34, the order of which can be changed while still ensuring the proper functioning of the automatic machine 1), and does not allow the changing of the values contained in the blocks 35, which represent necessary constraints for the correct processing of the articles.

According to some non-limiting embodiments, the master profile MP is a linear profile. In particular, during standard operation, the master profile MP is a motion profile with a constant speed.

According to non-limiting embodiments such as the embodiment illustrated in FIG. 6, the motion profile FP and the motion profile SP are position profiles.

According to further non-limiting embodiments not illustrated, the motion profile FP and the motion profile SP are speed profiles.

Alternatively or additionally, the motion profile FP and the motion profile SP specify torque profiles.

In other non-limiting cases, the master profile MP is the time flow. For instance, in such cases, the motion profiles FP, SP, MFP and MSP are speed profiles.

Advantageously, yet not necessarily, the automatic machine 1 is configured to carry out the method described up to this point.

Although the invention described above makes particular reference to a precise embodiment example, it is not to be construed as limited to this embodiment example, while all variants, modifications or simplifications that would be evident to one skilled in the art fall within its scope, such as, for instance: the addition of further actuators, a type of automatic machine other than a packaging machine of the tobacco industry, a different shape of the motion profiles, a different order of the steps of the method, a different number of motors, etc.

The present invention has multiple advantages.

First of all, it enables the performance of the set-up of a movable operating member directly on site and in a short amount of time, without the expenditure of materials such as shims and the consumption of tools such as drills, milling machines, files, etc.

Moreover, the method described above enables the identification and calculation of the differences between different automatic machines that are essentially similar, yet subject to different set-ups due to assembly and/or structural defects of the available parts.

Finally, the present invention enables the logging and sharing of a plurality of data items concerning the set-up of the movable operating members and consequently enables an understanding, remotely and/or with the help of digital systems, if errors were committed during the designing of the machine as well as potentially how to solve the same.

Further advantages stemming from the procedure according to the present invention relate to the improvement of post-sales support. For instance, a machine operator, if a movable operating member suffers gradual wear and tear, can autonomously change the motion profile of the same based on what he sees or identifies so that, as a result, the present invention avoids an immediate replacement of the parts of the automatic machine and/or the necessity of dispatching technical personnel to clients.

The invention claimed is:

1. A method to set up at least one movable operating member (5, 7) of an automatic machine (1) for manufacturing consumer articles (3); the method comprises the steps (16, 17) of:
    defining a first motion profile (FP) of the movable operating member (5, 7), through which at least one processing of the articles (3) is to be performed; and
    defining a corresponding second motion profile (SP) of an electric actuator system (8, 9), which, through a motion transmission system (12), is mechanically connected to the movable operating member (5, 7) and moves the movable operating member (5, 7) with the first motion profile (FP);
    determining possible imperfections in the processing of the articles (3) caused by the movable operating member (5, 7);
    correcting, by means of an interface device (15) of the automatic machine (1) and based on the possible imperfections in the processing of the articles (3), the first motion profile (FP), thus obtaining a first changed profile (MFP) of the movable operating member (5, 7);
    calculating, through a control unit (14), a reverse kinematics of the first changed profile (MFP) of the movable operating member (5, 7) through the motion transmission system (12) so as to obtain a second changed second profile (MSP) to be commanded to the electric actuator system (8, 9); and
    identifying one or more knots (K) of the first motion profile (FP); said knots (K) being changeable by means of the interface device (15).

2. The method according to claim 1 and comprising the further step (21) of changing the control in order to control the electric actuator system (8, 9) so as to perform the corresponding second changed profile (MSP).

3. The method according to claim 1, wherein the step (18) of determining possible imperfections and/or the step (19) of correcting the first motion profile (FP) are carried using the interface device (15) of the automatic machine (1); and the step (18) of determining possible imperfections is repeated following the step (19) of correcting the first motion profile (FP).

4. The method according to claim 1, wherein the first motion profile (FP) and the corresponding second motion profile (SP) comprise at least one work phase (WP) and at least one recovery phase (RP), during which the step (21) of changing the control takes place.

5. The method according to claim 1, wherein the first motion profile (FP) comprises at least one linear function segment (LF) and/or at least one polynomial function segment (PF) and said knots (K) are the inflection points or the connection points of said function segments (LF, PF).

6. The method according to claim 1 and comprising the step (23) of defining a tolerance interval (I) to limit the change of each knot (K); wherein the tolerance interval (I) comprises an upper limit (UL) and a lower limit (IL).

7. The method according to claim 6, wherein, before calculating the reverse kinematics, the control unit (14) checks whether all the knots (K) of the first motion profile (FP) of the movable operating member (5, 7) are each within the respective tolerance interval (I).

8. The method according to claim 1 and comprising the step (25) of gathering a plurality of data items concerning the step of correcting the first motion profile (FP); wherein, the plurality of data items are used to carry out corrections of the first motion profile (FP) during the designing of the automatic machine (1) and/or to understand possible calculation errors; and the plurality of gathered data items are used to train artificial intelligence systems.

9. The method according to claim 1, wherein the step (21) of changing the control takes place while the automatic machine (1) is still.

10. The method according to claim 1, wherein the step (21) of changing the control takes place while the automatic machine (1) is running.

11. The method according to claim 1, wherein the first motion profile (FP) and the second motion profile (SP) have a cam relation with a master profile (MP), and the master profile (MP) is the profile of a physical or virtual axis.

12. The method according to claim 11, wherein the master profile (MP) is linear, and the master profile (MP) is the time flow.

\* \* \* \* \*